INVENTOR.
FREDERICK R. ALLIN
BY
RICHEY, McNENNY & FARRINGTON
ATTORNEYS

United States Patent Office 3,022,797
Patented Feb. 27, 1962

3,022,797
DRAIN VALVE
Frederick R. Allin, Glendale, Calif., assignor to The Weatherhead Company, Cleveland, Ohio, a corporation of Ohio
Filed Oct. 28, 1959, Ser. No. 849,208
5 Claims. (Cl. 137—599.2)

This invention relates to valves, and more particularly to drain valves suitable for use with storage tanks and the like.

A principal object of the present invention is to provide a drain valve which when installed on a storage tank, or similar container, projects a minimum distance from the tank surface and yet allows complete draining of the tank without leaving a residual pool of the contents around the valve portion which projects into the tank.

Another object of this invention is to provide a drain valve of the character described in the preceding object which has no projecting handles or other parts which are subject to breakage nor are subject to snagging or other accidental contact which may cause unintentional operation of the valve.

Another object of this invention is to provide a drain valve of the character described in the preceding objects which is readily opened and closed by one hand without the use of wrenches or other special tools.

Still another object of this invention is to provide a drain valve of the character described in the preceding objects which may be opened by pushing on a plunger member after which the valve will remain in the open condition until released by pushing on a sleeve member, or alternatively may be opened by pushing on the sleeve member and will remain in the open condition only so long as force is applied to the sleeve member, the release of the force allowing the valve to close.

Additional objects and advantages of the invention will become apparent to those skilled in the art from the following detailed description of the preferred embodiment of the invention whose construction and operation is shown in the accompanying drawings in which.

Figure 1:
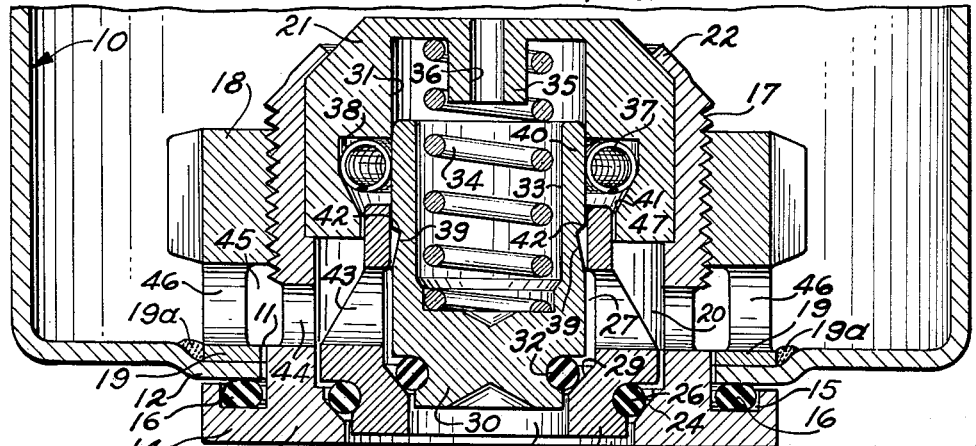
FIG. 1 is an elevational view in section of the valve in the closed position as installed in a tank.

As is shown in FIG. 1, a typical mounting for the valve is in the bottom of a tank or sump 10 having an opening 11 and a seat portion 12 to receive the valve and permit a leak-proof seal between the tank and valve. The valve has a body 13 on the lower end of which is a flange 14 which may have flats for receiving a wrench to aid in the installation and removal of the valve. To provide a leak-proof joint between the body 13 and the tank, flange 14 has an annular groove 15 on its upper surface to receive an O-ring seal 16 which seals against seat 12. The upper end of body 13 has a threaded portion 17 which engages a suitable nut 18 which secures the valve in position in the tank opening. The nut 18 is preferably secured integrally with the tank walls and therefore it is provided with a bearing portion 19 which seats on the upper surface of seat 12 and is welded in place as shown at 19a before the valve is installed.

The operating mechanism of the valve is located inside a chamber 20 formed within body 13. The upper end of chamber 20 contains a cap or plug 21 which, when the valve is assembled, is pressed in place after which lip 22 on the upper end of body 13 is spun or peened over to hold the cap 21 in place. The lower end of chamber 20 is reduced in diameter to form a discharge port 23, just above which is located a conical surface portion 24 which functions as a valve seat.

A sleeve 25 is positioned in the lower portion of chamber 20 and carries an O-ring seal 26 adapted to make sealing contact with valve seat 24. Inside of sleeve 25 is an upper bore portion 27 and a reduced lower bore or port 28 at the juncture of which bores is located another conical valve seat 29. In order to seal port 28, a plunger 30 is fitted within upper bore 27 of sleeve 25 and extends upward into a bore 31 within cap 21. The lower end of plunger 30 is provided with an O-ring seal 32 which seats against valve seat 29 on the sleeve. A cavity 33 is provided in the upper portion of plunger 30 to receive one end of a compression spring 34. The upper end of spring 34 is seated around a projection 35 on cap 21. Projection 35 contains a vent passage 36 to allow fluid to enter and drain from the chamber formed by cavity 33 and bore 31 as plunger 30 is raised and lowered during the operation of the valve.

In order to hold plunger 30 in the raised or opened position, a detent mechanism is provided in the form of an annular coiled spring member or garter spring, 37. This garter spring 37 is fitted loosely in an annular recess 38 in cap 21. A coacting pocket for the garter spring is provided on the plunger in the form of annular groove 39 which is gripped by the garter spring to hold the plunger in the raised position against the force of compression spring 34.

Figures 2, 4:
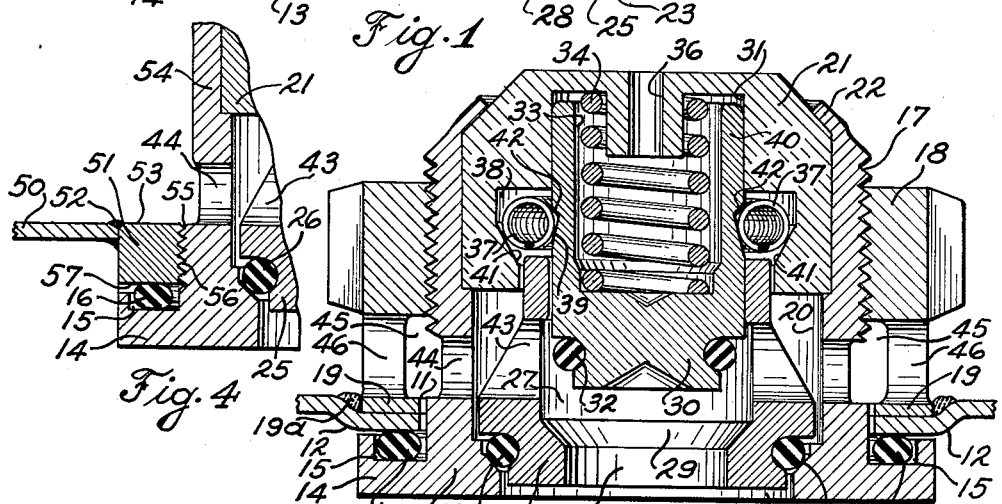
FIG. 2 is a sectional view similar to FIG. 1, but showing the valve in the open position.
FIG. 4 is a fragmentary elevational view in section showing an alternative installation of the valve in a tank.

To open the valve, all that is necessary is to use a screw driver or some other pointed tool to push upwards on plunger 30 until it is locked in the upper position by the detent mechanism, as is shown in FIGURE 2. As is best shown in FIGURE 1, when the valve is in the closed position, the garter spring 37 is positioned around the smooth, cylindrical upper portion 40 of plunger 30. As the plunger is raised, the garter spring, which remains fixed in annular recess 38, slides over upper portion 40 with little friction, and when the plunger reaches the upper position where annular groove 39 lies opposite the annular recess 38, garter spring 37 is then free to contract slightly by slipping into the groove 39.

If pressure is now released from plunger 30, the plunger moves downward slightly under the influence of compression spring 34. At first the garter spring 37 is free to move downward a short distance within annular recess 38 before it contacts the sloping, conical lower wall 41 of the recess. The action of this conical surface tends to force the garter spring more tightly into engagement with groove 39 and tends to roll the spring up into firm contact with the steeply sloped upper side 42 of groove 39. This coaction of conical wall 41 and groove side 42 provides a self-locking action for the garter spring to lock the plunger tightly in the open position, even though the garter spring may be of such light construction as to provide normally only a rather weak radial gripping force on the plunger.

The sleeve 25 is provided with a plurality of radial passages 43 which serve as discharge openings for the fluid from chamber 20 going out through port 28. Chamber 20 in turn is connected by means of radial passageways 44 to an annular space or manifold 45 located between the outer surface of body 13 and the inner surface of nut 18. An additional set of radial passages 46 located in nut 18 just above bearing portion 19 allows fluid to enter manifold 45 directly from the tank. The purpose of providing the manifold portion 45 is to ensure that fluid can pass freely from passages 46 into passages 44 regardless of the relative positions of the nut 18 and body 13 when the valve is fastened in place.

Figure 3:
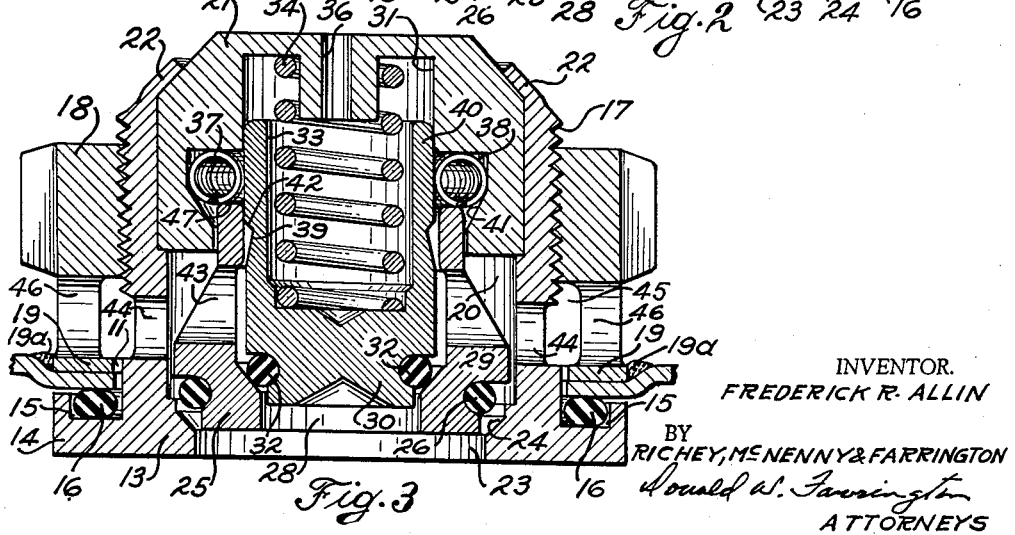
FIG. 3 is a sectional view similar to FIGS. 1 and 2, but showing the method of closing the valve.

In order to close the valve all that is necessary is to use a tool such as that used for opening the valve and lift upward on sleeve 25, as best shown in FIGURE 3. As sleeve 25 moves upward, its upper edge 47 contacts the lower edge of the garter spring 37 to move it upward out of contact with conical wall 41. Because compression spring 34 is relatively much stiffer than garter spring 37, the plunger 30 remains stationary and the garter spring 37 expands radially outward from groove 39 onto upper portion 40 of the plunger. As this is done, the force of spring 34 is now able to force plunger 30 downward until O-ring 32 is firmly seated on valve seat 29 in the sleeve.

At this point, fluid is still free to flow between O-ring 26 and valve seat 24 since the sleeve 25 is in the raised position. Accordingly, if the pressure applied by the tool is now released, the force of spring 34 urges plunger 30 and sleeve 25 downward as a unit until the O-ring 26 on the sleeve firmly seats on valve seat 24 on body 13 to close off completely discharge port 23.

Although the previously described operation of the valve employed the raising of plunger 30 to open the valve after which it was locked in the open position and the raising of sleeve 25 to allow the valve to snap closed, the valve may be operated also in a manner which provides momentary action, i.e., where the valve remains open only so long as pressure is applied to it. To operate the valve in this manner, all that is necessary while the valve is in the closed position is to push upward on sleeve 25 instead of on plunger 30. As is also shown in FIGURE 3, this causes the sleeve and plunger to move upwards as a unit a short distance until stopped when the upper end 47 of the sleeve contacts the garter spring 37. When the sleeve is in this position, fluid can pass from chamber 20 out between O-ring seal 26 and valve seat 24 through the discharge port 23, although the rate of flow under these conditions is somewhat restricted by the limited clearance.

Because the passages 43, 44, and 46 extend radially through the valve, they may be positioned so that the lower surfaces are at the same level as or below the lower surface of the tank 10. Since the valve is sealed on the valve seats 24 and 29 which are located below the passages 43, 44, and 46, the fluid in the tank may be completely drained without leaving a residual pool such as would occur if the drain passages of the valve were located at the upper end of the valve and above the bottom of the tank.

An alternative method of mounting the drain valve in the tank is shown in FIGURE 4. The tank 50 is provided with an annular insert 51 which is welded at 52 around its outer periphery to secure it integrally to the tank walls so that the upper surface 53 of the insert is flush with the inner side of the tank wall. The valve body 54 is similar to body 13 of the embodiment shown in FIGURES 1 to 3 except that it has threads 55 on its outer periphery between the flange 14 and passages 44. These threads 55 engage mating threads 56 on the inner periphery of insert 51 when the valve is screwed into place in the tank. The O-ring seal 16 fits within annular groove 15 in the flange 14 and seals against the lower surface 57 of the insert 51. The remainder of the valve structure is unaltered from that shown in FIGURES 1 to 3. Since the lower portion of the passages 44 is level with the upper surface 53 of the insert, it will be seen that the tank will be able to drain completely without leaving a residual pool when the valve is opened.

Although a preferred embodiment of the invention has been shown and described in detail, it will be understood that various modifications and arrangements may be made without departing from the scope of the invention which is defined in the following claims.

Having thus described my invention, I claim:

1. A valve comprising a cylindrical body, said body having an upper end closure and an open lower end portion, said body having an annular chamber opening into said lower end portion, said chamber having a valve seat adjacent said open lower end portion, a sleeve axially movable in said chamber having annular closure means for engaging said body valve seat, said sleeve having a chamber interiorly thereof, said sleeve chamber having an outlet adjacent its lower end, a valve seat in said sleeve chamber adjacent said outlet, passage means opening on the exterior of said body and opening into said sleeve chamber above said sleeve valve seat, a plunger axially movable in said sleeve chamber having closure means for engaging said sleeve valve seat, said body having an annular recess extending radially outward about said plunger, an annular groove on the periphery of said plunger, detent means within said annular recess and adapted to engage said annular groove to hold said plunger closure means out of contact with said sleeve valve seat, said sleeve being axially movable to disengage said detent means from said annular groove, and resilient means between said upper end closure and said plunger normally urging said plunger closure means into engagement with said sleeve valve seat and thereby urging said sleeve closure means into engagement with said body valve seat.

2. A valve comprising a cylindrical body, said body having an upper end closure and an open lower end portion, said body having an annular chamber opening into said lower end portion, said chamber having a valve seat adjacent said open lower end portion, a sleeve axially movable in said chamber having annular closure means for engaging said body valve seat, said sleeve having a chamber interiorly thereof, said sleeve chamber having an outlet adjacent its lower end, a valve seat in said sleeve chamber adjacent said outlet, passage means opening on the exterior of said body and opening into said sleeve chamber above said sleeve valve seat, a plunger axially movable in said sleeve chamber having closure means for engaging said sleeve valve seat, said body having an annular recess extending radially outward about said plunger, an annular groove on the periphery of said plunger spaced from its upper end, an annular coil spring within said annular recess and adapted to engage said annular groove to hold said plunger closure means out of contact with said sleeve valve seat, said sleeve being axially movable to disengage said annular coil spring from said annular groove, and resilient means between said upper end closure and said plunger normally urging said plunger closure means into engagement with said sleeve valve seat and thereby urging said sleeve closure means into engagement with said body valve seat.

3. A valve comprising a cylindrical body, said body having an upper end closure and an open lower end portion, said body having an annular chamber opening into said lower end portion, said chamber having a valve seat adjacent said open lower end portion, first passage means interconnecting the exterior of said body and said annular chamber above said body valve seat, a sleeve movable in said chamber having annular closure means for engaging said body valve seat, said sleeve having a chamber interiorly thereof, said sleeve chamber having an outlet adjacent its lower end, a valve seat in said sleeve chamber adjacent said outlet, second passage means interconnecting said annular chamber and said sleeve chamber above said sleeve valve seat, a plunger axially movable in said sleeve chamber having closure means for engaging said sleeve valve seat, an annular groove on the periphery of said plunger, said body having an annular recess extending radially outward about said plunger, the lower surface of said annular recess being inclined downwardly and inwardly, an annular coil spring within said annular recess and adapted to engage said annular groove to hold said plunger closure means out of contact with said sleeve valve seat, said sleeve being axially movable to disengage said annular coil spring from said annular groove, and resilient means between said upper end closure and said plunger normally urging said plunger closure means into engagement with said sleeve valve seat and thereby urging said sleeve closure means into engagement with said body valve seat.

4. A valve comprising a cylindrical body, said body having an upper end closure and an open lower end portion, said body having an annular chamber opening into said lower end portion, said chamber having a valve seat adjacent said open lower end portion, a sleeve movable in said chamber having annular closure means for engaging said body valve seat, said sleeve having a chamber interiorly thereof, said sleeve chamber having an outlet adjacent its lower end, a valve seat in said sleeve chamber adjacent said outlet, passage means opening on the exterior of said body and opening into said sleeve chamber above said sleeve valve seat, a plunger in said sleeve chamber having closure means for engaging said sleeve valve seat, detent means engageable to hold said plunger closure means out of contact with said sleeve valve seat, said sleeve being axially movable to disengage said detent means and release said plunger, and resilient means between said upper end closure and said plunger normally urging said plunger closure means into engagement with said sleeve valve seat and thereby urging said sleeve closure means into engagement with said body valve seat.

5. A valve comprising a cylindrical body, said body having an upper end closure and an open lower end portion, a threaded portion on the periphery of said body adjacent said upper end closure, a nut having a threaded portion engageable on said threaded body portion and extending toward said lower end portion, said body having an annular chamber opening into said lower end portion, said chamber having a valve seat adjacent said open lower end portion, a radially extending passage in said body communicating with said body chamber above said body valve seat, a radially extending passage in said nut below said threaded portion and communicating with said body passage, a sleeve movable in said chamber having annular closure means for engaging said body valve seat, said sleeve having a chamber interiorally thereof, said sleeve chamber having an outlet adjacent its lower end, a valve seat in said sleeve chamber adjacent said outlet, a passage in said sleeve above said sleeve valve seat and communicating with said body passage, a plunger in said sleeve chamber having closure means for engaging said sleeve valve seat, said body having an annular recess extending radially outward about said plunger, an annular groove on the periphery of said plunger, detent means within said annular recess and adapted to engage said annular groove to hold said plunger closure means out of contact with said sleeve valve seat, said sleeve being axially movable to disengage said detent means from said annular groove, and resilient means between said upper end closure and said plunger normally urging said plunger closure means into engagement with said sleeve valve seat and thereby urging said sleeve closure means into engagement with said body valve seat.

References Cited in the file of this patent
UNITED STATES PATENTS

| | | |
|---|---|---|
| 1,464,745 | Campbell | Aug. 14, 1923 |
| 2,280,309 | Graham | Apr. 21, 1942 |
| 2,370,182 | Morrow | Feb. 27, 1945 |
| 2,655,932 | Lipman | Oct. 20, 1053 |
| 2,692,112 | Szitar | Oct. 19, 1954 |

FOREIGN PATENTS

| | | |
|---|---|---|
| 589,549 | Great Britain | June 24, 1947 |